(12) United States Patent
Gregorat

(10) Patent No.: US 6,594,229 B1
(45) Date of Patent: Jul. 15, 2003

(54) DATA SYNCHRONIZATION SYSTEM FOR REDUNDANT PACKET ROUTING ARCHITECTURE AND METHOD OF OPERATION

(75) Inventor: Sandro Gregorat, Dallas, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/461,164

(22) Filed: Dec. 14, 1999

(51) Int. Cl.[7] ................................. H04J 12/26
(52) U.S. Cl. ........................ 370/219; 370/216
(58) Field of Search ............... 370/216, 219, 370/220, 217, 218, 412, 227, 360, 428, 429

(56) References Cited

U.S. PATENT DOCUMENTS 5,471,460 A * 11/1995 Tanabe
5,671,213 A * 9/1997 Kurano .................. 370/218
5,909,427 A * 6/1999 Manning et al. .......... 370/219

* cited by examiner

Primary Examiner—Ken Vanderpuye

(57) ABSTRACT

There is disclosed, for use in a packet switched network, a redundant switch comprising 1) a primary packet router for routing a first stream of data packets from an input interface to an output interface of the redundant switch; 2) a secondary packet router for routing a second stream of data packets corresponding to the first stream of data packets from the input interface to the output interface; 3) a packet ID generator for attaching a unique identifier to each data packet in the first stream of data packets and attaching the same unique identifier to each corresponding data packet in the second stream of data packets; and 4) a comparator for comparing a first unique identifier associated with a first data packet processed by the primary packet router with a second unique identifier associated with a second data packet associated with the secondary packet router. The comparator, in response to a determination that the first and second unique identifiers match, causes the second data packet associated with the secondary packet router to be deleted.

20 Claims, 9 Drawing Sheets

DATA SYNCHRONIZATION SYSTEM FOR REDUNDANT PACKET ROUTING ARCHITECTURE AND METHOD OF OPERATION

TECHNICAL FIELD OF THE INVENTION

The present invention is directed, in general, to packet routing systems and, more specifically, to a system for providing a seamless switchover from a primary packet routing device to a secondary packet routing device.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

A consequential development relating to the increased popularity of LANs has been the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. These include packet switching protocols, such as X.25, ISDN, frame relay, and ATM, among others.

Packet switching involves the transmission of data in packets through a network. Each block of end-user data that is to be transmitted is divided into packets. A unique identifier, a sequence number and a destination address are attached to each data packet. The packets are independent and may traverse the data network by different routes. The packets may incur different levels of propagation delay, or latency, caused by physical paths of different length. The packets may be held for varying amounts of delay time in packet buffers in intermediate switches in the network. The packets also may be switched through different numbers of packet switches as the packets traverse the network, and the switches may have unequal processing delays caused by error detection and correction.

As a result, the packets may arrive out-of-order at the destination node. However, the destination node uses the identification and sequencing information in each data packet to assemble the data packets back in the proper order before continuing to process the original end-user data block.

To enhance the reliability of a packet switched network, it is common practice to build the packet switches as redundant devices. Each packet switch contains a primary (also called "master" or "active") packet routing engine that ordinarily performs packet routing and a secondary (also called "slave" or "standby") packet routing engine that takes over from the primary packet routing engine upon failure or upon the occurrence of certain selected events.

In such redundant architectures, the primary packet routing engine and the secondary packet routing engine receive and process the same inputs (incoming packets) in such a way that the secondary packet routing engine mirrors the behavior of the primary packet routing engine. However, only the primary packet routing engine is allowed to perform physical output on the outgoing packets. The secondary packet routing engine also produces the outgoing packets but the physical output is negated. This type of "hot" secondary packet routing engine allows a switchover (failover) procedure to consist of a simple reversal of the output mechanism (i.e., the output of the primary packet routing engine is disabled and the output of the secondary packet routing engine is enabled).

This type of redundant architecture has basic flaws, however. The two packet routing engine may generate the same packets in the output, but without special synchronization mechanisms, the different I/O behavior of the packet routing engines may lead to differences in task scheduling. This, in turn, may produce a different output sequence from each packet routing engine. Also, even if the sequence is the same, the timing of the outputs may be different. In general, when multiple data streams are funneled through a packet engine, the overall message output sequence is not a deterministic function of the inputs, it varies instead with the load. Moreover, the timing of the actual output is not deterministic. In this configuration, a switchover consisting of a simple reversal of the output mechanism—disabling the output of the primary packet routing engine and enabling the output of the secondary packet routing engine—lead to packet losses and/or duplications.

There is therefore a need in the art for improved redundancy architecture for use in a packet routing device. In particular, there is a need for an improved redundant packet architecture that provides a smooth switchover from a primary packet routing engine to a secondary packet routing engine. More particularly, there is a need for a redundant packet architecture that enables a primary packet routing engine to be switched over to a secondary packet routing engine without the loss of data packets or the duplicate processing of data packets.

SUMMARY OF THE INVENTION

To address the above-discussed deficiencies of the prior art, it is a primary object.of the present invention to provide, for use in a packet switched network, a redundant switch comprising 1) a primary packet router capable of routing a first stream of data packets from an input interface to an output interface of the redundant switch; 2) a secondary packet router capable of routing a second stream of data packets corresponding to the first stream of data packets from the input interface to the output interface of the redundant switch; 3) a packet ID generator capable of attaching a unique identifier to each data packet in the first stream of data packets and attaching the unique identifier to each corresponding data packet in the second stream of data packets; and 4) a comparator capable of comparing a first unique identifier associated with a first data packet processed by the primary packet router with a second unique identifier associated with a second data packet associated with the secondary packet router, wherein the comparator, in response to a determination that the first and second unique identifiers match, is capable of causing the second data packet associated with the secondary packet router to be deleted. In some embodiments of the present invention, the comparator may be implemented as a specific-purpose comparator circuit. In other embodiment of the present invention, the comparator may be implemented as software executed by a processor, such as a packet router.

In one embodiment of the present invention, the secondary packet router comprises an outbound data packet queue capable of storing the second data packet.

In another embodiment of the present invention, the comparator is capable of causing the second data packet to be deleted from the outbound data packet queue.

According to still another embodiment of the present invention, the primary packet router comprises a first outbound data packet queue capable of storing the first data packet.

According to yet another embodiment of the present invention, the secondary packet router comprises a second outbound data packet queue capable of storing the second data packet and the comparator receives the first unique identifier from the first outbound data packet queue and receives the second unique identifier from the second outbound data packet queue.

According to a further embodiment of the present invention, the comparator is capable of causing the second data packet to be deleted from the second outbound data packet queue.

According to a still further embodiment of the present invention, the redundant switch further comprises a peripheral device coupled to the primary packet router, wherein the peripheral device is capable of receiving and storing the first data packet and the first unique identifier received from primary packet router.

According to a yet further embodiment of the present invention, the secondary packet router comprises an outbound data packet queue capable of storing the second data packet and the comparator receives the first unique identifier from the peripheral device and receives the second unique identifier from the outbound data packet queue and wherein the comparator is capable of causing the second data packet to be deleted from the outbound data packet queue.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switching network.

Figure 1:
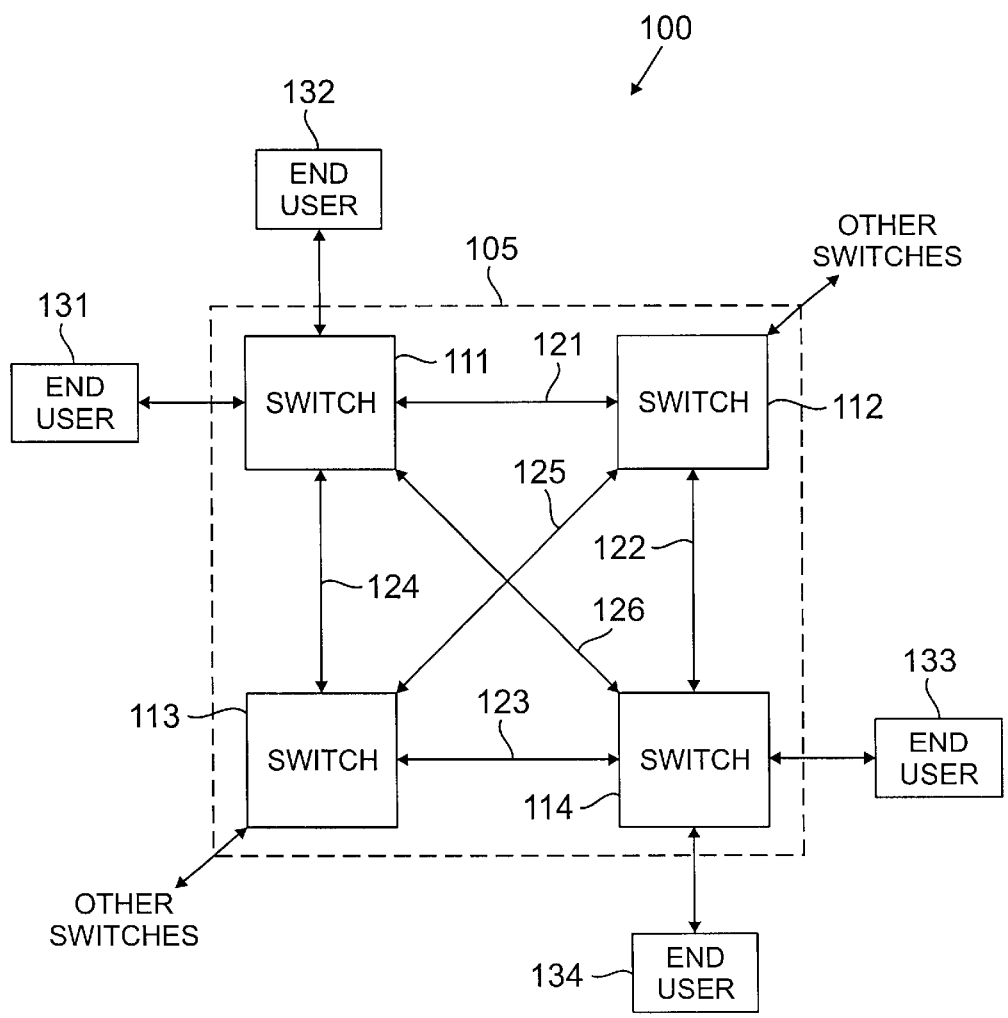
FIG. 1 illustrates an exemplary packet switching network containing redundant packet switches in accordance with the principles of the present invention.

FIG. 1 illustrates an exemplary packet switching network 100 containing redundant packet switches 111–114 in accordance with the principles of the present invention. Packet switching network 100 contains a subnetwork 105, indicated by a dotted line, comprising packet switches 111–114, that interconnects end-user devices 131–134 with each other and with other switches (not shown) and other end-user devices (not shown) associated with packet switching network 100. Packet switches 111–114 are interconnected by data links 121–126. Subnetwork 105 is intended to be a representative portion of packet switching network 100, which may contain many other redundant packet switches similar to packet switches 111–114.

End-user devices 131–134 each may comprise any commonly known processing device, such as a telephone, a personal computer (PC), a fax machine, an office LAN, a network server, or the like, that may communicate via a packet switching network. For example, end-user 131 may comprise a remote network server that is sending a data file to end-user 133, which is a desktop PC. The data file that is to be transmitted is segmented into data packets in end-user 131. An identifier for the data transfer is appended to each data packet. A sequence number is also appended to each packet, as is a destination address associated with end-user 133.

Next, the data packets are transferred to packet switch 111. Packet switch 111 may transfer the data packets to end-user 133 by several physical paths. For example, packet switch 111 may send the data packets directly to packet switch 114 across data link 126. If the data traffic load on data link 126 is heavy, packet switch 111 may send some or all of the data packets indirectly to packet switch 114 via data link 121, packet switch 112, and data link 122. Alternatively, packet switch 111 may send some or all of the data packets indirectly to packet switch 114 via data link 124, packet switch 113, and data link 123. Packet switch 114 transfers the data packets to end user device 133, which uses the identifier information and the sequence numbers from each data packet to reassemble the original data file sent by end-user device 131.

To enhance the reliability of packet switching network 100, at least some of the switches therein, such as switches 111–114, are redundant systems that include a primary (or master) packet routing engine and a secondary (or slave) packet routing engine. The primary packet routing engine may switchover to the secondary packet routing engine upon the occurrence of a failure or upon a system command. The present invention provides a unique way to perform a seamless switchover of a redundant system performing packet routing, with minimum disruption of packet processing during the switchover.

Figure 2:
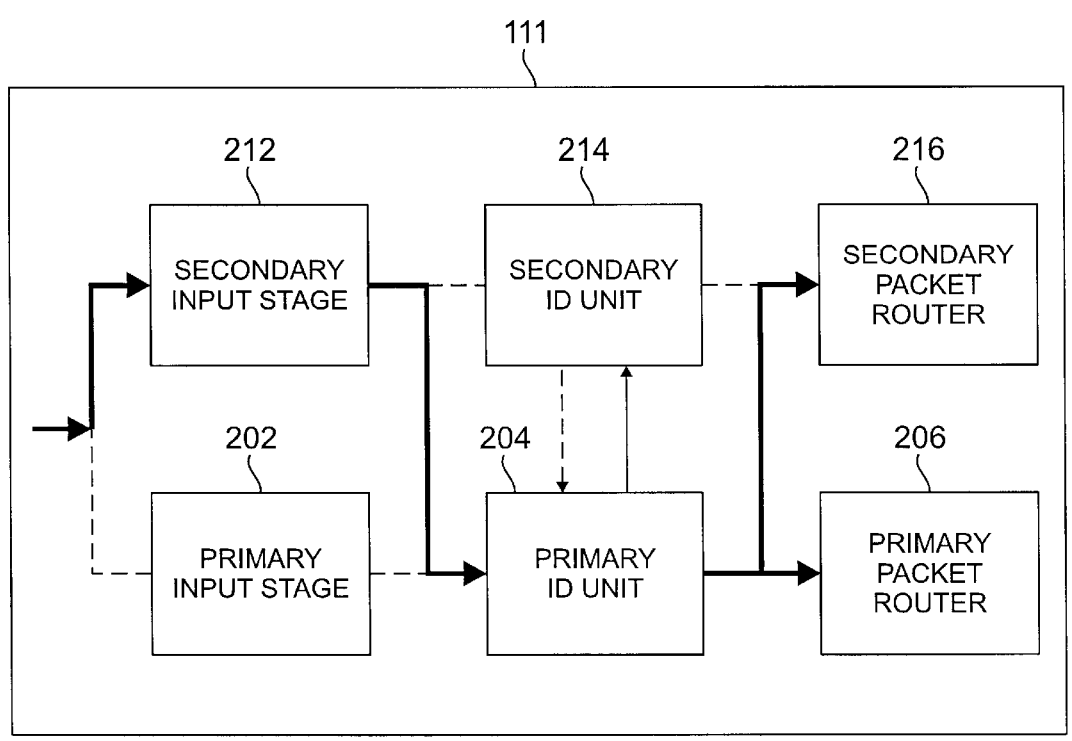
FIG. 2 illustrates a portion of a representative switch in which redundant packet routing engines receive incoming data packets from a common source according to a first embodiment of the present invention.

FIG. 2 illustrates a portion of representative switch 111 in which redundant packet routing engines receive incoming data packets from a common source according to a first embodiment of the present invention. Switch 111 comprises a primary packet processing branch consisting of primary input stage 202, primary identification (ID) unit 204, and primary packet router 206. Switch 111 also comprises a secondary packet processing branch consisting of secondary input stage 212, secondary ID unit 214, and secondary packet router 216. Each element within a processing branch is identical to the same-named element in the alternate processing branch.

In FIGS. 2 through 8, the active data paths are indicated by solid lines and the standby data paths are indicated by dashed lines. The active components are connected to incoming and outgoing active (i.e.; solid line) data paths. Thus, the active path and elements for FIG. 2 comprise secondary input stage 212, primary ID unit 204, and either the primary or secondary packet router 206 or 216. Any combination of one input stage and one ID unit may be configured to interface with both packet routers. As illustrated, each packet router receives the same packet data from primary ID unit 204 with both packet routers being capable of serving as the active router.

Secondary input stage 212 receives and stores incoming data packets and transfers the received data packets to primary ID unit 204. Correspondingly, primary input stage 202 recognizes that it is the "inactive" or "standby" input stage and monitors its interfaces as required for switchover purposes.

Redundant primary ID unit 204 and secondary ID unit 214 are unique to the present invention and comprise similar circuits that generate sequential packet identification codes (IDs). Each packet ID is unique for each data packet in a sequence of data packets, with the identical packet ID being present in both ID units. Primary ID unit 204 and secondary ID unit 214 comprise circuitry for generating the same series of sequential packet IDs. The initialization or synchronization of the first packet ID may occur with a power-on reset, under software control, at the completion of processing of a pre-determined number of data packets, or by other well-known methods.

In addition to data packets that are received from external sources, the processing of a "parent" data packet may cause primary packet router 206 to generate one or more additional internal "child" data packets. The child data packets may be returned to primary ID unit 204 to receive a unique packet ID, or a unique packet ID may be generated and attached to the child data packet within primary packet router 206 itself. All internally generated packets, including packets generated by a periodic procedure that is activated at selected times in both the primary and the secondary units, are tagged by a specific identifier. An internal mechanism in primary ID unit 204 or secondary ID unit 214, or both, guarantees that the same identifiers are associated with corresponding packets generated internally for the same purpose in primary ID unit 204 and secondary ID unit 214.

In one embodiment of the present invention, the unique packet ID of the child packets comprises the packet ID of the parent packet, plus a unique sequence number. For example, a parent packet having a packet ID of 1007 may produce a first child packet having a packet ID of 1007.001, a second child packet having a packet ID of 1007.002, and a third child packet having a packet ID of 1007.003.

In order to ensure that identical incoming data packets in the primary data path and the secondary data path have the same packet ID, in one embodiment of the present invention, the active ID unit (primary ID unit 204) transfers its generated packet ID to the standby ID unit (secondary ID unit 214), as indicated by the solid vertical line in FIG. 2 connecting primary ID unit 204 and secondary ID unit 214. Secondary ID unit 214 then attaches the packet ID received from primary ID unit 204 to the identical data packet.

Primary ID unit 204 simultaneously transfers received data packets to primary packet router 206 and secondary packet router 216. When ID unit switchover occurs, secondary ID unit 214 becomes active and transfers data packets with the appropriate sequential packet ID for simultaneous output to primary and secondary packet routers 206 and 216.

Primary packet router 206 and secondary packet router 216 comprise identical redundant circuits with both packet routers receiving forwarded data packets from the active ID unit. In the case of FIG. 2, both packet routers receive data packets from primary ID unit 204 which is serving as the active ID unit, as previously discussed. When secondary ID unit 214 becomes the active ID unit, both packet routers receive data packets from secondary ID unit 214.

Figure 3:
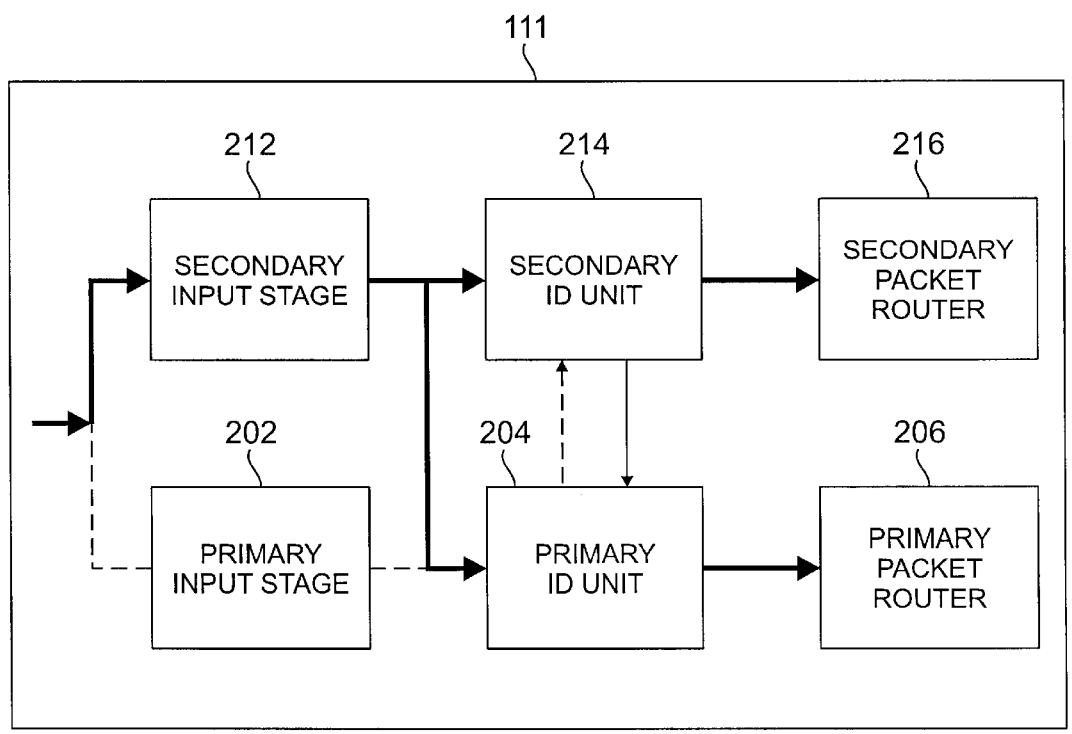
FIG. 3 illustrates a portion of a representative switch in which redundant packet routing engines receive incoming data packets from a common source according to a second embodiment of the present invention.

FIG. 3 illustrates a portion of representative switch 111 in which redundant packet routing engines receive incoming data packets from a common source according to a second embodiment of the present invention. Again, switch 111 comprises a primary packet processing branch consisting of primary input stage 202, primary ID unit 204, and primary packet router 206. Switch 111 also comprises a secondary packet processing branch consisting of secondary input stage 212, secondary ID unit 214, and secondary packet router 216. For this embodiment, either one of the two input stages may be active, with the active input stage transferring the same data packets to the redundant ID units. In turn, the ID units transfer data packets with attached packet IDs to the associated packet router. As in the case of FIG. 2, each element of the primary and secondary packet processing branch is identical to the same-named element in the alternate packet processing branch.

In FIG. 3, secondary input stage 212 is the active input stage, transferring data packets from its input to redundant ID units 204 and 214. Primary input stage 202 serves as the standby input stage with its input and output being disabled as indicated by dashed lines. When switchover of input stages occurs, secondary input stage 212 disables its input and output interfaces and primary input stage 202 becomes active, enabling the transfer of input data packets to the redundant ID units. In FIG. 3, secondary ID unit 214 generates packet IDs and transfers the packet IDs to primary ID unit 204 to ensure that identical data packets have identical packet IDs.

Figure 4:
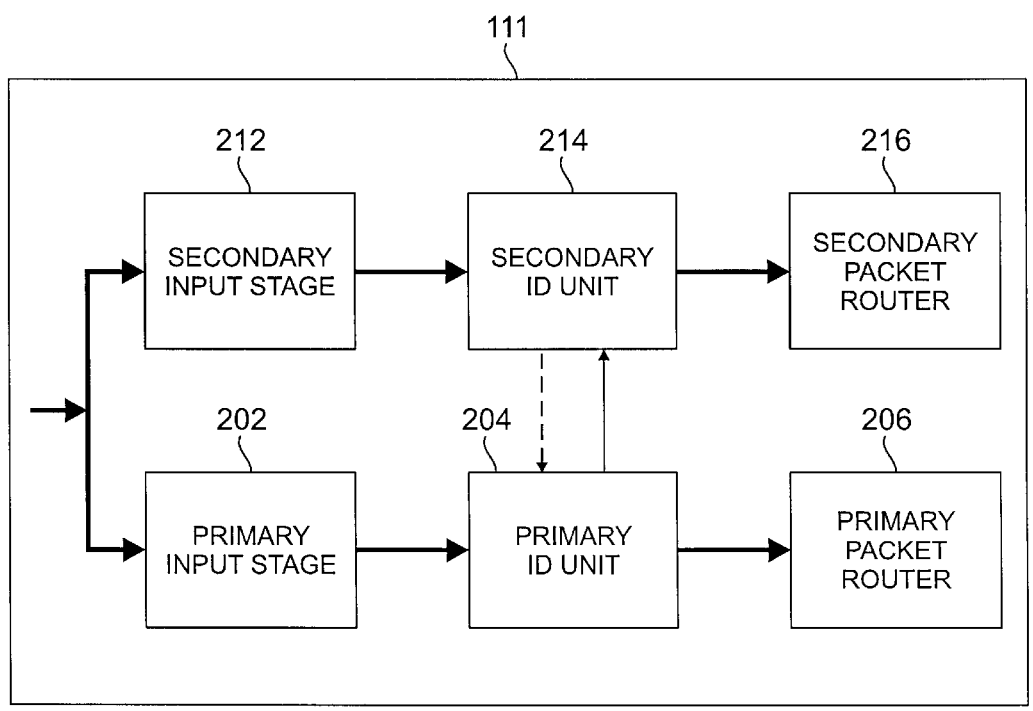
FIG. 4 illustrates a portion of a representative switch in which redundant packet routing engines receive incoming data packets from a common source according to a third embodiment of the present invention.

FIG. 4 illustrates a portion of representative switch 111 in which redundant packet routing engines receive incoming data packets from a common source according to a third embodiment of the present invention. As in FIGS. 2 and 3, switch 111 comprises a primary packet processing branch consisting of primary input stage 202, primary ID unit 204, and primary packet router 206. Switch 111 also comprises a secondary packet processing branch consisting of secondary input stage 212, secondary ID unit 214, and secondary packet router 216.

Again, the elements in this embodiment provide the same basic capability as described for FIGS. 2 and 3, with the primary difference being determined by the switching configuration. Primary input stage 202, primary ID unit 204, and primary packet router 206 provide the active path as indicated by the solid line data path from primary ID unit 204 to secondary ID unit 214.

Figure 5:
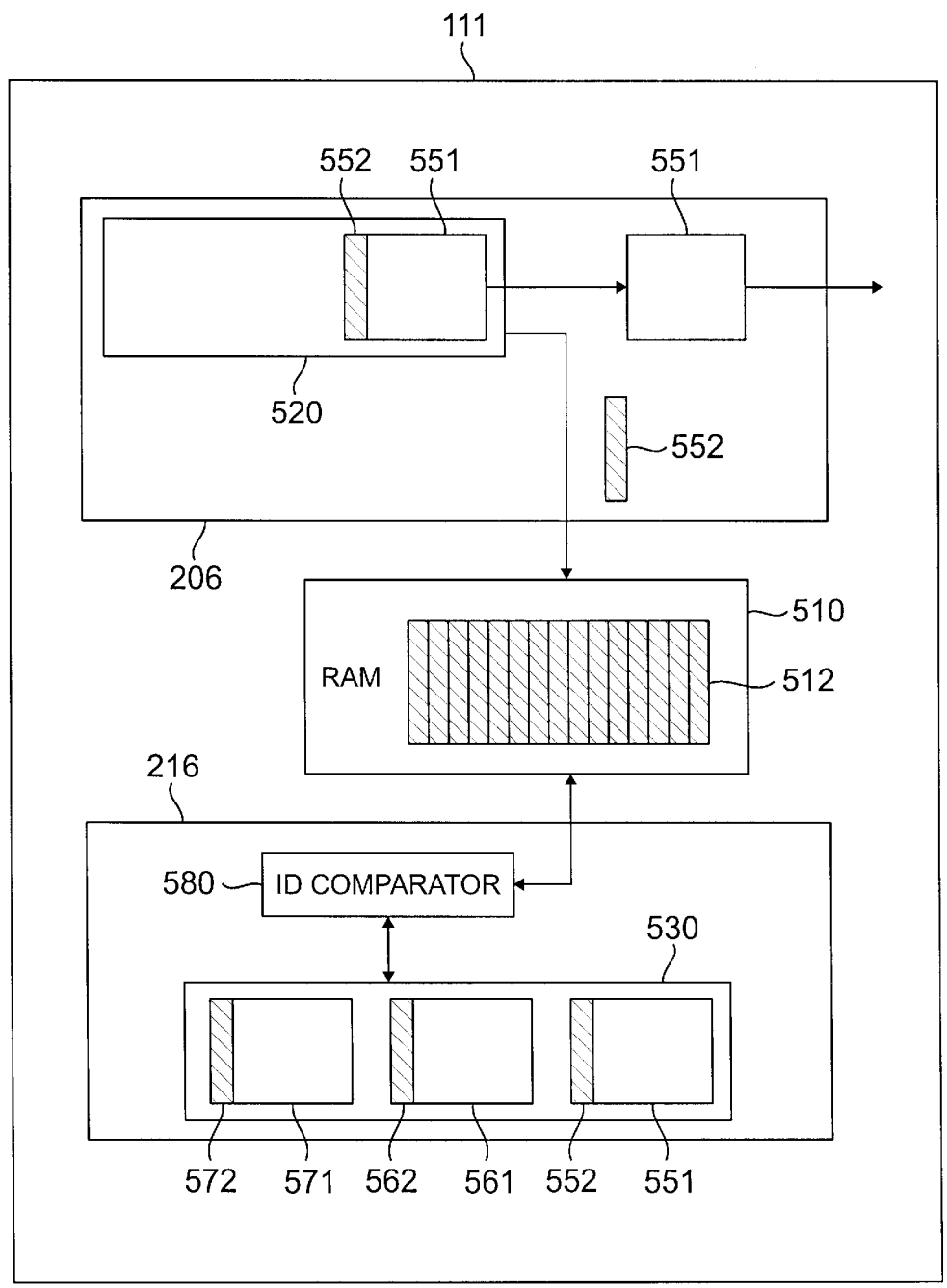
FIG. 5 illustrates a portion of a representative switch in which redundant packet routers coordinate synchronization of data packets by communicating through a random access memory (RAM) according to a fourth embodiment of the present invention.

FIG. 5 illustrates primary packet router 206, secondary packet router 216, and shared random access memory (RAM) 510 in switch 111 in greater detail according to a fourth embodiment of the present invention. Primary packet router 206, which is the active packet router, comprises outbound packet queue 520 which contains data packet 551 and associated packet ID 552. Secondary packet router 216, which is the standby packet router, comprises outbound packet queue 530, which contains data packet 551 and associated packet ID 552, data packet 561 and associated packet ID 562, and data packet 571 and associated packet ID 572. Secondary packet router 216 also comprises ID comparator 580. Since primary packet router 206 and secondary packet router 216 are identical, primary packet router 206 also comprises an ID comparator similar to ID comparator 580. However, the ID comparator in primary packet router 206 is not shown in order avoid redundant description.

In some embodiments of the present invention, ID comparator 580 may be implemented in hardware as a dedicated, specific-purpose comparator circuit. In other embodiments of the present invention, comparator 580 may be implemented as software executed by a processor, such as a packet router. The same is true for ID comparators shown in FIGS. 6–8.

Primary packet router 206 removes the packet ID of each packet that is transmitted out of primary packet router 206 and stores it in RAM 510. The ID of each transmitted (or sent) packet is stored in Sent Packet List 512 in RAM 510. ID comparator 580 reads the sent packet IDs from Sent Packet List 512 in RAM 510 and compares these packet IDs with packet IDs presently in outbound packet queue 530. Secondary packet router 216 discards data packets from outbound packet queue 530 that have packet IDs equal to the packet IDs in Sent Packet List 512 in RAM 510. In this case, secondary packet router 216 determines that data packet 551 in outbound packet queue 530 has packet ID 552 which matches the sent packet ID 552 stored in RAM 510 and removes data packet 551 and packet ID 552 from output packet queue 530.

In this manner, if a failure occurs in primary packet router 206 and secondary packet router 216 becomes active (i.e., becomes the new primary), then secondary packet router 216 begins processing at the same point where primary packet router 206 stopped processing. Thus, there will be no loss of data packets and no duplicate processing of the same data packets upon switchover.

Figure 6:
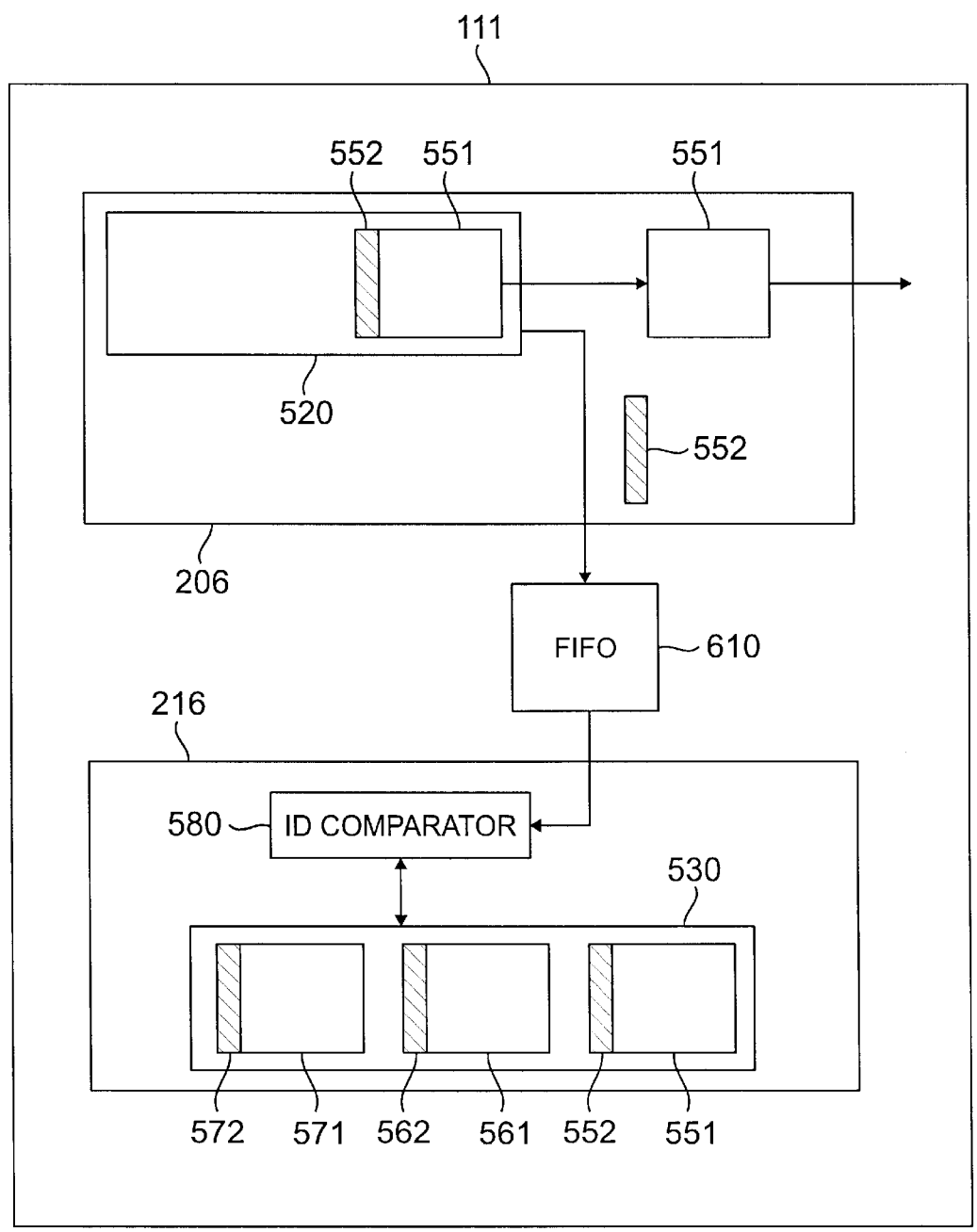
FIG. 6 illustrates a portion of a representative switch in which redundant packet routers coordinate synchronization of data packets through a commonly shared first-in-first-out (FIFO) storage element according to a fifth embodiment of the present invention.

FIG. 6 illustrates primary packet router 206, secondary packet router 216, and first-in-first-out (FIFO) register 610 in switch 111 according to a fifth embodiment of the present invention. As in the case of FIG. 5, primary packet router 206 comprises outbound packet queue 520 which contains data packet 551 and associated packet ID 552. Secondary packet router 216 comprises outbound packet queue 530, which contains data packet 551 and associated packet ID 552, data packet 561 and associated packet ID 562, and data packet 571 and associated packet ID 572. Secondary packet router 216 also comprises ID comparator 580.

Primary packet router 206 removes the packet ID of each data packet that is transmitted out of primary packet router 206 and stores it in FIFO 610 for access by secondary packet router 216. ID comparator 580 reads transmitted (or sent) packet IDs from FIFO 610 and compares the packet IDs with packet IDs presently available in outbound packet queue 530. Secondary packet router 216 discards data packets from outbound packet queue 530 that have packet IDs equal to the packet IDs received from FIFO 610. In this case, secondary packet router 216 determines that data packet 551 in outbound packet queue 530 has packet ID 552 which matches packet ID 552 in FIFO 610 and removes data packet 551 and packet ID 552 from output packet queue 530.

Figure 7:
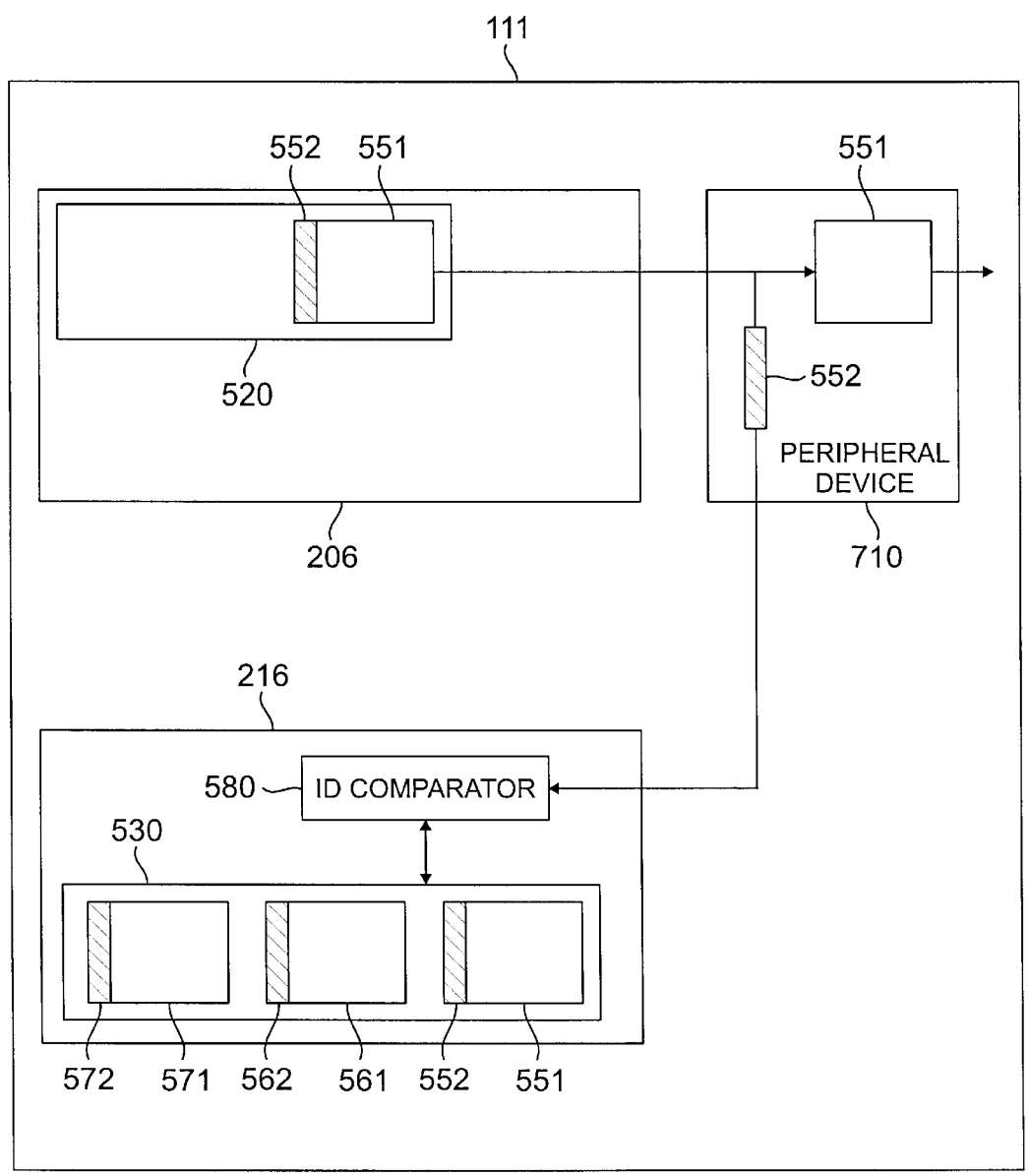
FIG. 7 illustrates a portion of a representative switch and a peripheral device in which the peripheral device coordinates synchronization of data packets through redundant packet routers with ID comparators according to a sixth embodiment of the present invention.

FIG. 7 illustrates primary packet router 206, secondary packet router 216, and peripheral device 710 in switch 111 in greater detail according to a sixth embodiment of the present invention. Primary packet router 206 comprises outbound packet queue 520, which contains data packet 551 and associated packet ID 552. Secondary packet router 216 comprises outbound packet queue 530, which contains data packet 551 and associated packet ID 552, data packet 561 and associated packet ID 562, and data packet 571 and associated packet ID 572. Secondary packet router 216 also comprises ID comparator 580. Peripheral device 710 also contains copies of data packet 551 and associated packet ID 552.

Primary packet router 206 serves as the active packet router and outputs data packet 551 with packet ID 552 to peripheral device 710. Peripheral device 710 removes packet ID 552 from data packet 551, transfers data packet 551 to an external output, signals to primary packet router 206 the completion of the output operation, and transfers packet ID 552 back to secondary packet router 216. ID comparator 580 receives packet ID 552 from peripheral device 710 and compares it to packet IDs presently available in outbound packet queue 530. As previously described, secondary packet router 216 determines that data packet 551 in outbound packet queue 530 has packet ID 552 which matches packet ID 552 from peripheral device 710 and removes data packet 551 and packet ID 552 from output packet queue 530.

Figure 8:
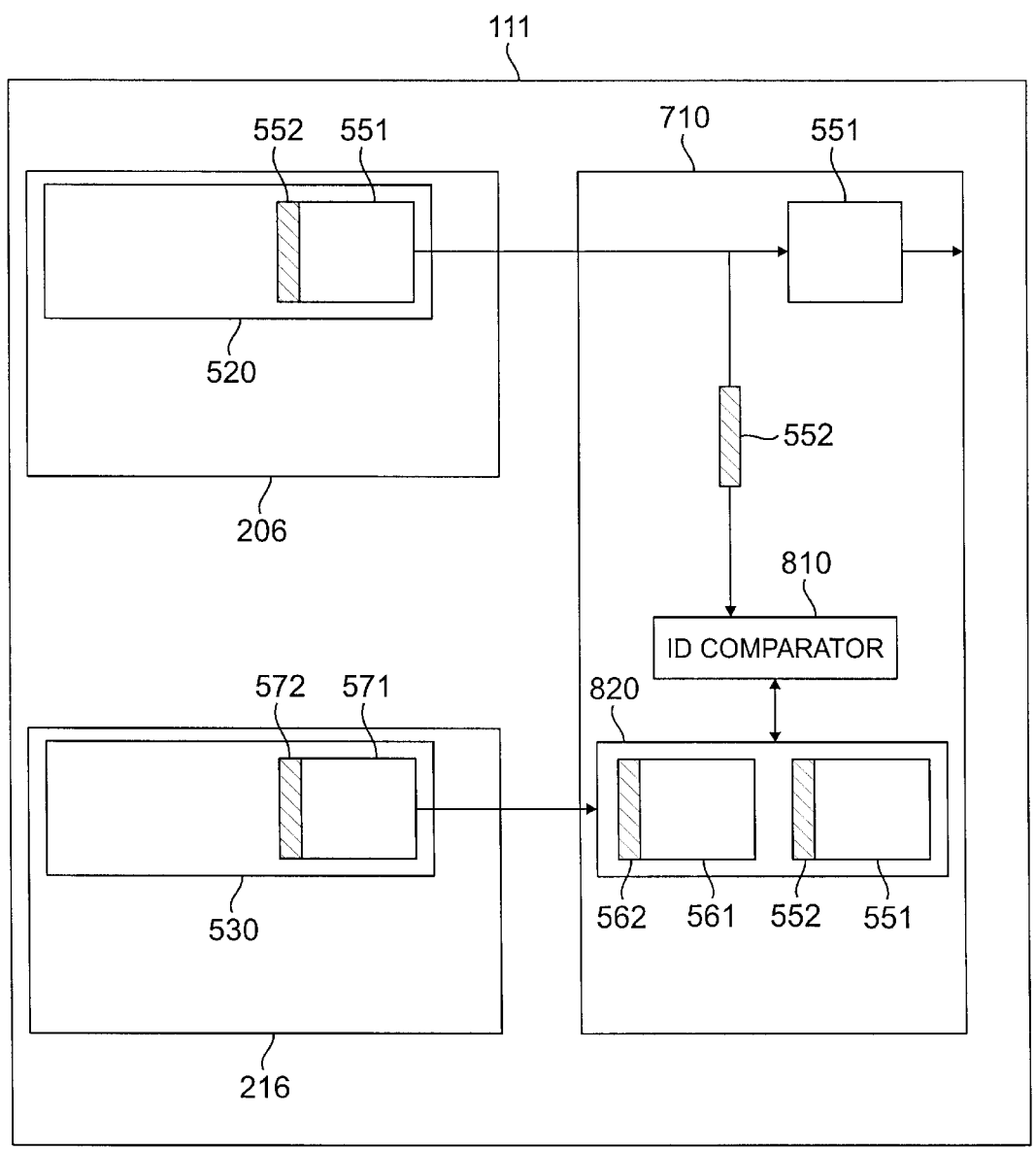
FIG. 8 illustrates a portion of a representative switch and a peripheral device with a packet ID comparator in which the peripheral device coordinates synchronization of data packets through redundant packet routers according to a seventh embodiment of the present invention.

FIG. 8 illustrates primary packet router 206, secondary packet router 216, and peripheral device 710 in switch 111 in greater detail according to a seventh embodiment of the present invention. Primary packet router 206 comprises outbound packet queue 520, which contains data packet 551 and associated packet ID 552. Secondary packet router 216 comprises outbound packet queue 530, which contains data packet 571 and associated packet ID 572. Peripheral device 710 contains copies of data packet 551 and packet ID 552. Peripheral device 710 also comprises ID comparator 810 and outbound packet queue 820. Outbound packet queue 820 stores data received from secondary packet router 216, such as data packet 551 and associated packet ID 552 and data packet 561 and associated packet ID 562.

Primary packet router 206 and secondary packet router 216 transfer data packets from their respective outbound packet queues to peripheral device 710. Primary packet router 206 serves as the active packet router and outputs data packet 551 with packet ID 552 to peripheral device 710. Peripheral device 710 removes packet ID 552 from data packet 551, transfers the data packet 551 to an external device, and signals to primary packet router 206 the completion of the output operation. ID comparator 810 receives packet ID 552 and compares it with packet IDs in outbound data queue 820. ID comparator 810 determines that data packet 551 in outbound packet queue 820 has packet ID 552 which matches packet ID 552 received from primary packet router 206 and removes data packet 551 and packet ID 552 from output packet queue 820.

Figure 9:
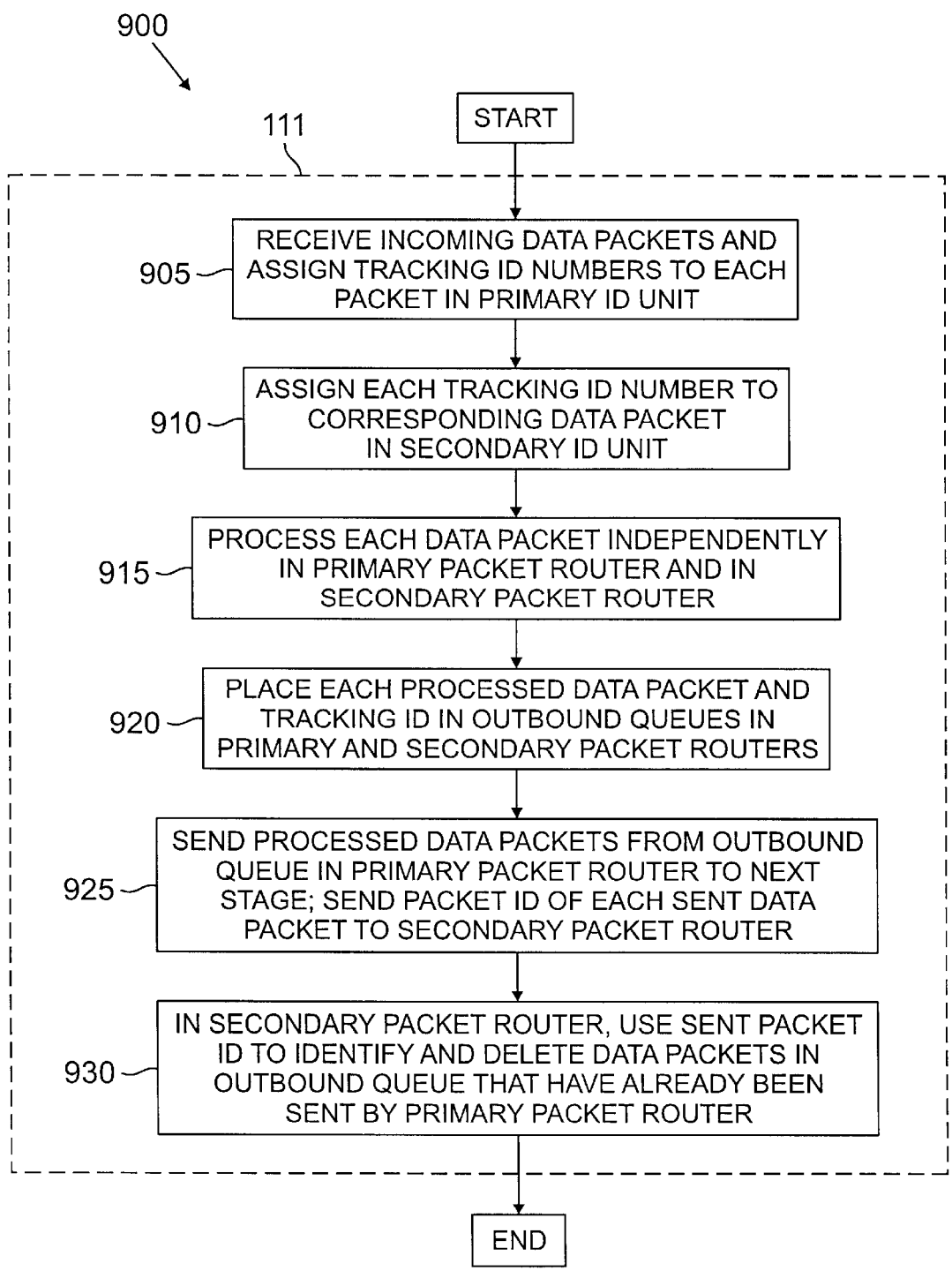
FIG. 9 illustrates a representative flow diagram in which redundant packet processing branches coordinate synchronization of data packets according to the principles of the present invention.

FIG. 9 is a flow diagram which illustrates the operation of an exemplary embodiment of switch 111. Initially, switch 111 receives incoming data packets and primary ID unit 204 attaches or assigns a packet ID to each incoming data packet in order to track the incoming data packets (process step 905). Next, secondary ID unit 214 attaches the same packet ID to the corresponding data packet in secondary ID unit 214 (process step 910). Primary and secondary packet routers 206 and 216 independently process received data packets with attached packet IDs (process step 915). Each packet router temporarily stores the received data packets with corresponding tracking packet IDs into its corresponding outbound queue (process step 920).

Primary packet router 206 subsequently removes the packet ID from the next outgoing data packet and transfers the outgoing data packet without its packet ID to the next stage. Primary packet router 206 also transfers the removed packet ID to secondary packet router 216 (process step 925). Secondary packet router 216 compares the packet ID associated with the transferred data packet with stored packet IDs in its outbound queue and deletes any data packet that has the same packet ID. Thus, secondary packet router 216 deletes data packets transferred by the primary packet router 206, resulting in data packets which are synchronized with the system should a switchover occur.

Although the present invention has been described in detail, those skilled in the art should understand that they can make various changes, substitutions and alterations herein without departing from the spirit and scope of the invention in its broadest form.

What is claimed is:

1. For use in a packet switched network, a redundant switch comprising:

a primary packet router capable of routing a first stream of data packets from an input interface to an output interface of said redundant switch;

a secondary packet router capable of routing a second stream of data packets corresponding to said first stream of data packets from said input interface to said output interface of said redundant switch;

a packet ID generator capable of attaching a unique identifier to each data packet in said first stream of data packets and attaching said unique identifier to each corresponding data packet in said second stream of data packets; and a comparator capable of comparing a first unique identifier associated with a first data packet processed by said primary packet router with a second unique identifier associated with a second data packet associated with said secondary packet router, wherein said comparator, in response to a determination that said first and second unique identifiers match, is capable of causing said second data packet associated with said secondary packet router to be deleted.

2. The redundant switch set forth in claim 1 wherein said secondary packet router comprises an outbound data packet queue capable of storing said second data packet.

3. The redundant switch set forth in claim 2 wherein said comparator is capable of causing said second data packet to be deleted from said outbound data packet queue.

4. The redundant switch set forth in claim 1 wherein said primary packet router comprises a first outbound data packet queue capable of storing said first data packet.

5. The redundant switch set forth in claim 4 wherein said secondary packet router comprises a second outbound data packet queue capable of storing said second data packet and said comparator receives said first unique identifier from said first outbound data packet queue and receives said second unique identifier from said second outbound data packet queue.

6. The redundant switch set forth in claim 5 wherein said comparator is capable of causing said second data packet to be deleted from said second outbound data packet queue.

7. The redundant switch set forth in claim 1 further comprising a peripheral device coupled to said primary packet router, wherein said peripheral device is capable of receiving and storing said first data packet and said first unique identifier received from primary packet router.

8. The redundant switch set forth in claim 7 wherein said secondary packet router comprises an outbound data packet queue capable of storing said second data packet and said comparator receives said first unique identifier from said peripheral device and receives said second unique identifier from said outbound data packet queue and wherein said comparator is capable of causing said second data packet to be deleted from said outbound data packet queue.

9. A packet switched network comprising:

a plurality of nodes capable of transmitting and receiving data packets; and a plurality of packet switches for routing data packets between said plurality of nodes, at least one of said plurality of packet switches comprising a redundant switch, wherein said redundant switch comprises:

a primary packet router capable of routing a first stream of data packets from an input interface to an output interface of said redundant switch;

a secondary packet router capable of routing a second stream of data packets corresponding to said first stream of data packets from said input interface to said output interface of said redundant switch;

a packet ID generator capable of attaching a unique identifier to each data packet in said first stream of data packets and attaching said unique identifier to each corresponding data packet in said second stream of data packets; and a comparator capable of comparing a first unique identifier associated with a first data packet processed by said primary packet router with a second unique identifier associated with a second data packet associated with said secondary packet router, wherein said comparator, in response to a determination that said first and second unique identifiers match, is capable of causing said second data packet associated with said secondary packet router to be deleted.

10. The packet switched network set forth in claim 9 wherein said secondary packet router comprises an outbound data packet queue capable of storing said second data packet.

11. The packet switched network set forth in claim 10 wherein said comparator is capable of causing said second data packet to be deleted from said outbound data packet queue.

12. The packet switched network set forth in claim 9 wherein said primary packet router comprises a first outbound data packet queue capable of storing said first data packet.

13. The packet switched network set forth in claim 12 wherein said secondary packet router comprises a second outbound data packet queue capable of storing said second data packet and said comparator receives said first unique identifier from said first outbound data packet queue and receives said second unique identifier from said second outbound data packet queue.

14. The packet switched network set forth in claim 13 wherein said comparator is capable of causing said second data packet to be deleted from said second outbound data packet queue.

15. The packet switched network set forth in claim 9 further comprising a peripheral device coupled to said primary packet router, wherein said peripheral device is capable of receiving and storing said first data packet and said first unique identifier received from primary packet router.

16. The packet switched network set forth in claim 15 wherein said secondary packet router comprises an outbound data packet queue capable of storing said second data packet and said comparator receives said first unique identifier from said peripheral device and receives said second unique identifier from said outbound data packet queue and wherein said comparator is capable of causing said second data packet to be deleted from said outbound data packet queue.

17. For use in a redundant switch, a method of processing data packets comprising the steps of:

receiving a first stream of data packets from an input interface;

receiving a second stream of data packets corresponding to the first stream of data packets from the input interface;

attaching a unique identifier to each data packet in the first stream of data packets and attaching the same unique identifier to each corresponding data packet in the second stream of data packets;

processing the first stream of data packets in a primary packet router and sending the processed stream of data packets to an output interface of the redundant switch;

processing the second stream of data packets in a secondary packet router; and comparing a first unique identifier associated with a first data packet processed by the primary packet router with a second unique identifier associated with a second data packet processed by the secondary packet router; and in response to a determination that the first and second unique identifiers match, deleting the second data packet associated with the secondary packet router.

18. The method set forth in claim 17 including the further step of storing the second data packet in an outbound data packet queue of the secondary packet router.

19. The method set forth in claim 18 wherein the step of deleting deletes the second data packet from the outbound data packet queue.

20. The method set forth in claim 17 wherein the primary packet router comprises a first outbound data packet queue capable of storing the first data packet.

* * * * *